US011072368B2

(12) United States Patent
Anderson

(10) Patent No.: US 11,072,368 B2
(45) Date of Patent: Jul. 27, 2021

(54) DYNAMICALLY AUGMENTED BIRD'S-EYE VIEW

(71) Applicant: Deere & Company, Moline, IL (US)

(72) Inventor: Noel W. Anderson, Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 356 days.

(21) Appl. No.: 16/254,225

(22) Filed: Jan. 22, 2019

(65) Prior Publication Data
US 2020/0231210 A1    Jul. 23, 2020

(51) Int. Cl.
*B62D 6/00* (2006.01)
*B62D 15/02* (2006.01)
(Continued)

(52) U.S. Cl.
CPC ............ *B62D 15/0295* (2013.01); *B60R 1/00* (2013.01); *B62D 6/001* (2013.01); *G01S 13/931* (2013.01); *G01S 17/931* (2020.01); *G05D 1/0238* (2013.01); *G05D 1/0257* (2013.01); *G06K 9/00805* (2013.01); *H04N 5/247* (2013.01); *H04N 5/265* (2013.01);
(Continued)

(58) Field of Classification Search
CPC ...... B62D 15/0295; B62D 6/001; B62D 6/00; G01S 17/931; G01S 13/931; H04N 5/247; H04N 5/265; H04N 13/239; H04N 7/181; H04N 5/2257; G06K 9/00805; G06K 9/00791; G05D 1/0238; G05D 1/0257; G05D 1/0248; B60R 1/00; B60R 2300/207; B60R 2300/607; A01B 69/00

USPC .......................................................... 701/41
See application file for complete search history.

(56) References Cited

U.S. PATENT DOCUMENTS 5,155,683 A * 10/1992 Rahim ................. G05D 1/0038
                                                    180/168
7,734,417 B2 * 6/2010 Chinomi ................... B60R 1/00
                                                    701/301
(Continued)

FOREIGN PATENT DOCUMENTS

DE    102014218059 A1    4/2016
DE    102016118237 A1    3/2018
(Continued)

*Primary Examiner* — Shardul D Patel

(57) ABSTRACT

In accordance with an example embodiment, a vehicle includes a moveable member, posture sensing system, bird's-eye camera system, display, and controller. The posture sensing system indicates the moveable member's posture. The bird's-eye camera system provides images of its field of view, including the ground adjacent to the vehicle. The controller receives a posture signal from the posture sensing system, receives images from the camera system, creates a rendered vehicle representation, creates a rendered path projection, and generates a dynamically augmented bird's-eye view then displays it on the display. The moveable member is positioned in the rendered vehicle representation using the posture signal. The rendered path projection includes an outer envelope line projecting the path of an outermost point of the vehicle, determined using the posture signal. The dynamically augmented bird's-eye view is generated using the images, rendered vehicle representation, and rendered path projection.

20 Claims, 6 Drawing Sheets

(51) Int. Cl.
    *H04N 5/247*    (2006.01)
    *H04N 5/265*    (2006.01)
    *G06K 9/00*     (2006.01)
    *H04N 13/239*   (2018.01)
    *G05D 1/02*     (2020.01)
    *B60R 1/00*     (2006.01)
    *G01S 13/931*   (2020.01)
    *G01S 17/931*   (2020.01)

(52) U.S. Cl.
    CPC ...... *H04N 13/239* (2018.05); *B60R 2300/207* (2013.01); *B60R 2300/607* (2013.01)

(56) References Cited

U.S. PATENT DOCUMENTS

| | | | | |
|---|---|---|---|---|
| 8,190,364 | B2* | 5/2012 | Rekow | G05D 1/0278 701/466 |
| 9,902,322 | B2* | 2/2018 | Kuehnle | B60R 1/00 |
| 2012/0262580 | A1* | 10/2012 | Huebner | G06K 9/00791 348/148 |
| 2013/0176192 | A1* | 7/2013 | Varga | G09B 9/003 345/7 |
| 2016/0138247 | A1* | 5/2016 | Conway | G01S 13/867 701/50 |
| 2016/0148421 | A1* | 5/2016 | Friend | G06T 11/00 345/629 |
| 2017/0050566 | A1* | 2/2017 | Yamashita | H04N 5/23238 |
| 2017/0284069 | A1* | 10/2017 | Machida | H04N 5/225 |
| 2018/0027179 | A1* | 1/2018 | Matsuzaki | G06K 9/00805 348/38 |
| 2018/0234496 | A1* | 8/2018 | Ratias | A63F 13/60 |
| 2018/0319392 | A1* | 11/2018 | Posselius | E02F 9/24 |

FOREIGN PATENT DOCUMENTS

| | | |
|---|---|---|
| DE | 102017204319 A1 | 9/2018 |
| WO | 2015049847 A1 | 4/2015 |

* cited by examiner

DYNAMICALLY AUGMENTED BIRD'S-EYE VIEW

TECHNICAL FIELD

The present disclosure generally relates to a system and method for visualizing a vehicle and its surrounding environment using multiple sensors. An embodiment of the present disclosure relates to creating a dynamically augmented bird's-eye view of the vehicle.

BACKGROUND

Vehicles may be equipped with multiple sensors configured to sense the surroundings of the vehicle. Such sensors may include cameras with a field of view of the area surrounding the vehicle, or radar or lidar units able to detect obstacles in their fields of view. A display may be provided in the vehicle which is generated using data from these sensors to give the operator a view of the vehicle's surroundings which can supplement what the operator can directly observe from the operator's location.

SUMMARY

Various aspects of examples of the present disclosure are set out in the claims.

According to an aspect of the present disclosure, a vehicle with a dynamically augmented bird's-eye view may include a moveable member attached to the vehicle, a posture sensing system, a bird's-eye camera system, a display, and a controller. The posture sensing system may be configured to provide a posture signal indicative of a posture of the moveable member. The bird's-eye camera system may have a field of view including ground surface adjacent to the vehicle, and be configured to provide images of its field of view. The controller may be in communication with the posture sensing system, the plurality of cameras, and the display. The controller may be configured to receive the posture signal from the posture sensing system, receive the images from the bird's-eye camera system, create a rendered vehicle representation, create a rendered path projection, and generate the dynamically augmented bird's-eye view then display it on the display. The rendered vehicle representation may include the moveable member, positioned in the rendered vehicle representation using the posture signal. The rendered path projection may include an outer envelope line representing the projected path of an outermost point of the vehicle, determined using the posture signal. The dynamically augmented bird's-eye view may be generated using a composite of the images, the rendered vehicle representation, and the rendered path projection.

According to another aspect of the present disclosure, the vehicle may also include a steering angle sensing system configured to provide a steering angle signal indicative of a steering angle of the vehicle. The controller may be in communication with the steering angle sensing system and further configured to receive the steering angle signal from the steering angle sensing system and adjust the outer envelope line using the steering angle signal.

According to another aspect of the present disclosure, the vehicle may also include a vehicle guidance system configured to automatically control the steering of the vehicle and to provide a planned path signal. The controller may be in communication with the vehicle guidance system and further configured to receive the planned path signal from the vehicle guidance system and adjust the outer envelope line using the planned path signal.

According to another aspect of the present disclosure, the vehicle may include an obstacle sensing system configured to provide an obstacle signal indicative of at least a position of an obstacle in the area surrounding the vehicle. The controller may be in communication with the obstacle sensing system and further configured to receive the obstacle signal, create a rendered obstacle representation with the obstacle positioned in the rendered obstacle representation using the obstacle signal, and generate the dynamically augmented bird's-eye view using a composite of the images, the rendered vehicle representation, the rendered path projection, and the rendered obstacle representation.

According to another aspect of the present disclosure, the controller may be configured to create the path projection to further include at least two tire lines each of which represents the projected path of a tire of the vehicle using the steering angle signal.

According to another aspect of the present disclosure, the controller may be configured to depict obstacles in the rendered obstacle representation in one of three styles, depending on whether the obstacle is outside the path of the vehicle, within a distance threshold of the vehicle or in the path of the vehicle but under a height threshold, or projected to intersect with the path of the vehicle.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

At least one example embodiment of the subject matter of this disclosure is understood by referring to FIGS. 1 through 6 of the drawings.

Figure 1:
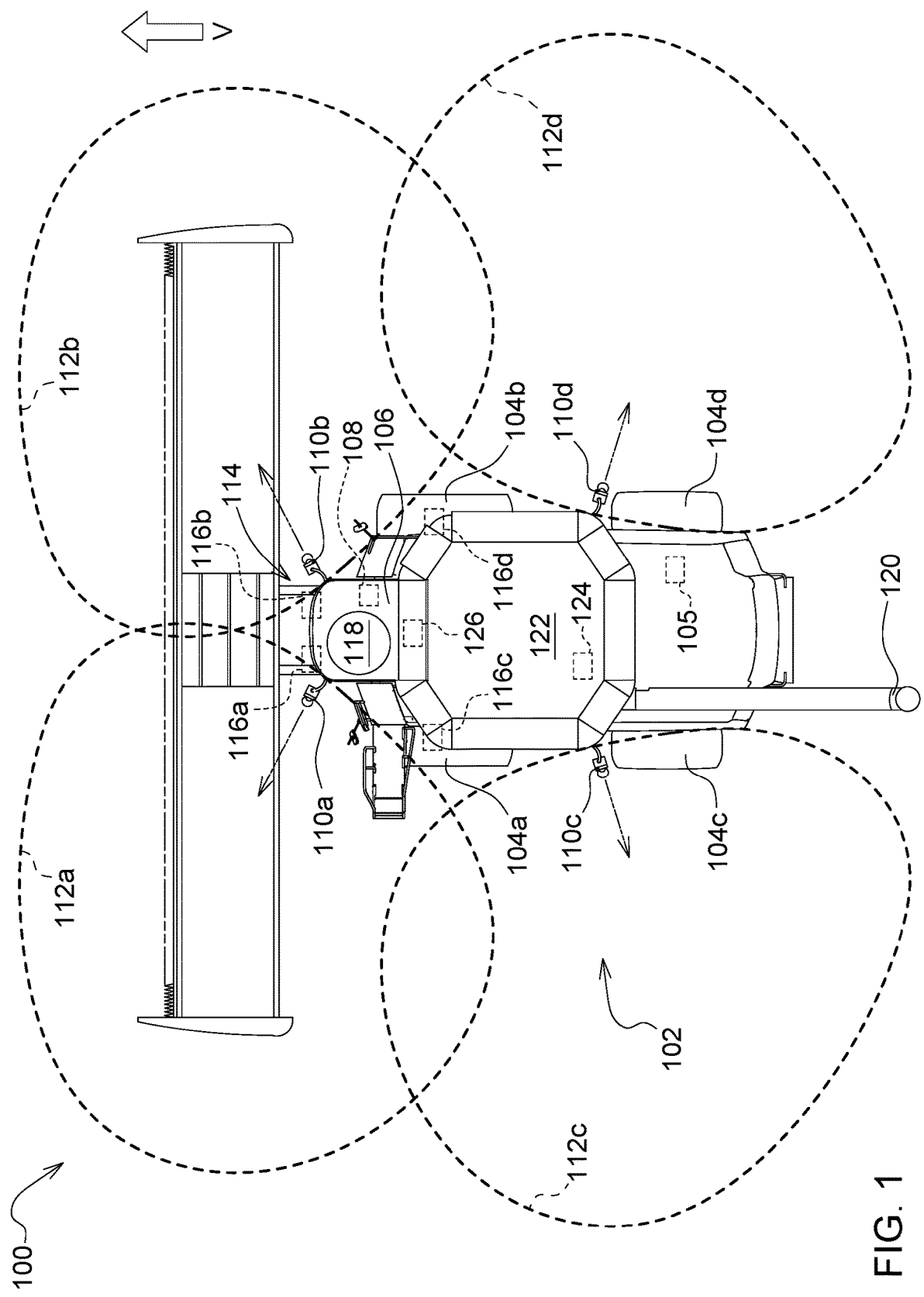
FIG. 1 is a top plan view of a work vehicle, in this case a combine harvester, in accordance with an embodiment of the present disclosure.

FIG. 1 illustrates a work vehicle 100, in this embodiment a combine harvester with a harvesting head attached. The work vehicle 100 is traversing a ground surface 102 in a forward direction V supported by four tires, 104*a* (front left), 104*b* (front right), 104*c* (rear left), and 104*d* (rear right). The work vehicle 100 has steerable rear wheels, so tires 104*c* and 104*d* may be steered at an angle relative to the remainder of work vehicle 100 in order to steer the vehicle. A steering angle sensing system 105 is configured to sense the steering angle of the work vehicle 100, for example by measuring the angle between certain components of the steering mechanism (e.g., steering links) using a rotary sensor and then using a kinematic model to determine a steering angle based on that measured angle. In alternative embodiments, the steering angle of the work vehicle 100 may be determined through alternative means, including through sensors configured to sense the position of other parts of the steering system.

An operator seated in the operator station 106 is operating the work vehicle 100. A display 108, sometimes referred to as a monitor or a screen, is located within the operator station 106 and positioned so as to be viewable by the operator during operation of the work vehicle 100. The display 108 may display any number of different items for the operator, such as the performance of the work vehicle 100, a map of the location of the work vehicle 100, or a bird's-eye view of the work vehicle 100, to name just a few of the potential views available on the display 108. A bird's-eye view, sometimes referred to as an overhead view, is a view of the work vehicle 100 from the perspective of an observer positioned directly above the work vehicle 100 and looking straight down. Such a view can be provided by a bird's-eye camera system, such as a camera placed in the position of such an observer (for example held by a support or a drone) or a plurality of cameras which are each placed below such a perspective but arranged such that each has a field of view of a different portion of the bird's-eye view but collectively cover the entire area desired.

The work vehicle 100 has a bird's-eye camera system comprising a plurality of cameras, cameras 110a, 110b, 110c, and 110d, which are attached to the work vehicle 100 in different locations to provide different fields of view that collectively cover the entire viewable area desired. Camera 110a is positioned at the front left of the work vehicle 100 near the roof of the operator station 106 so as to provide a field of view 112a of a portion of the ground surface 102 adjacent to the work vehicle 100. Similarly, camera 110b is positioned at the front right of the work vehicle 100 near the top of a body panel, camera 110c is positioned at the rear left near the roof of the operator station 106, and camera 110d is positioned at the rear right near the top of a body panel, so that each can provide a field of view 112b, 112c, and 112d, respectively, of a portion of the ground surface 102 adjacent to the work vehicle 100. The camera type and lens used, as well as the position of the camera, may be chosen to achieve different fields of view, depending on the application. For example, a larger field of view may be achieved by using a camera with a fish-eye lens placed high on the vehicle, with the upper limit to the field of view limited by lens optics and the height at which the camera can be placed. In alternative embodiments, the bird's-eye camera system may be a single camera with such a lens placed at a sufficient height relative to the vehicle. As another example, a smaller field of view may be achieved using a narrow angle lens and/or a lower camera placement, which reduces the field of view but may provide greater resolution, reduced distortion, or may frame the field of view to focus on a particular area of interest.

The work vehicle 100 also has an obstacle sensing system 114 which includes cameras 110a-b, radar units 116a-d, and lidar unit 118 for sensing terrain and obstacles ahead of the work vehicle 100. The images from the cameras 110a-b may be processed using known stereo vision processing techniques to sense the range and size of obstacles, or provide the identification of such obstacles. Radar units 116a-d may each be a radar transceiver or system capable of transmitting radio waves, sensing returning radio waves from that transmission, and analyzing the return signal to sense the environment, for example to determine the range and relative speed of obstacles (or terrain) reflecting the transmitted radio waves. Similarly, lidar unit 118 utilizes transmitted and reflected light to sense the range and/or relative speed of obstacles (or terrain) reflecting the transmitted light. Radar units 116a-d and lidar unit 118 may be systems well known in the art to sense the surroundings for a vehicle. Multiple cameras, radar, and lidar units may be utilized to provide coverage of all the areas of interest, which in FIG. 1 includes two cameras 110a-b, four radar units 116a-d, and one lidar unit 118 which collectively cover the area in front of the work vehicle 100, approximately 180 degrees. In other embodiments, the radar and/or lidar units may be spaced differently or additional units may be utilized to enable coverage around the entirety of the work vehicle 100, which may be referred to as 360 degree coverage. In other embodiments, radar units may be used only to provide coverage in areas where the operator may have reduced visibility. In this embodiment, the cameras 110a-b, radar units 116a-d, and the lidar unit 118 each provide signals directly to a vehicle-level controller which is collectively the obstacle signal, but in other embodiments the obstacle sensing system 114 is a subsystem with its own controller that receives signals from each of the radar units 116a-d and the lidar unit 118 and uses those to form a single obstacle signal that is then sent to a vehicle-level controller.

Figure 2:
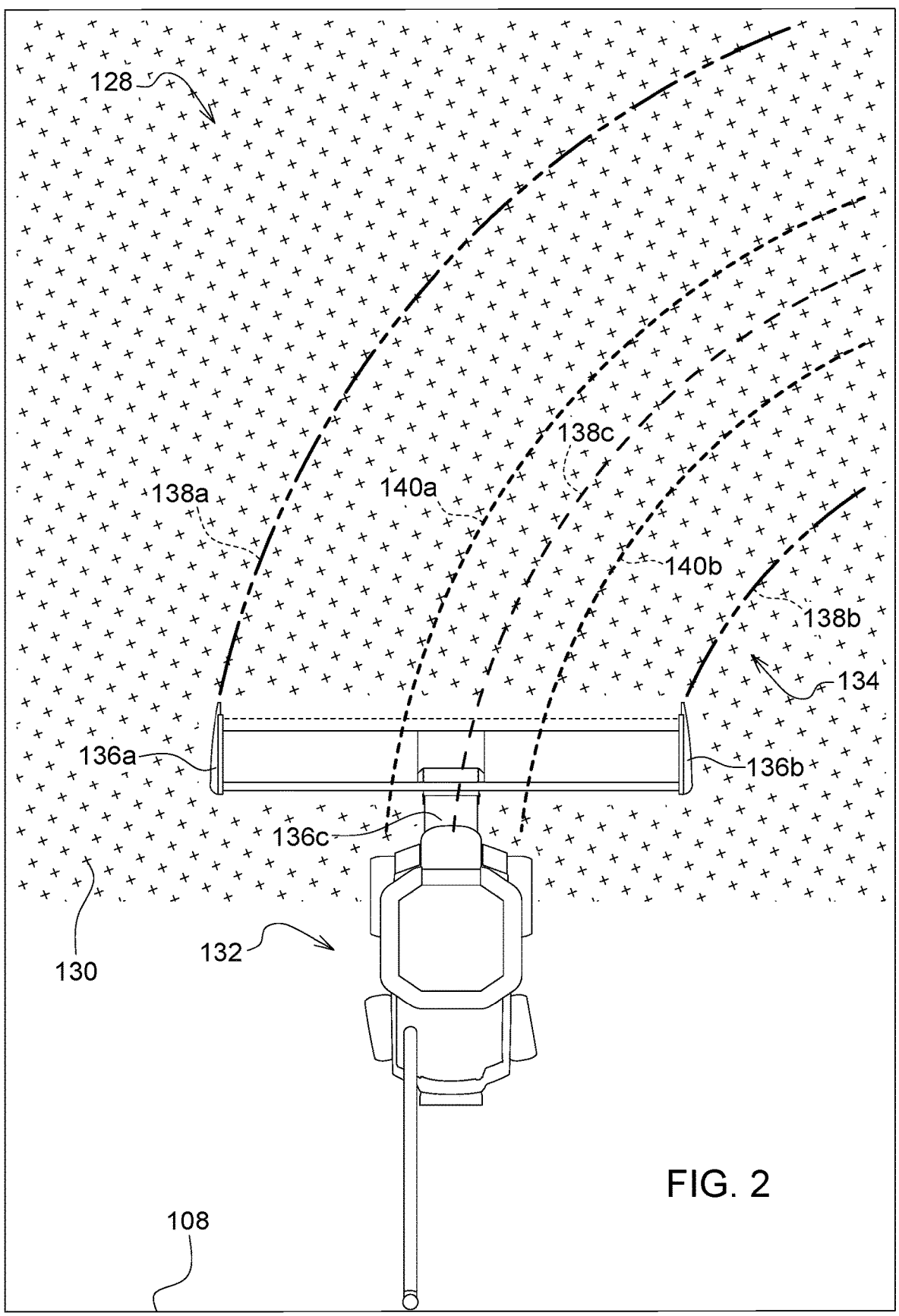
FIG. 2 is a view of a display with a bird's-eye view of the work vehicle in a first setting.
Figure 3:
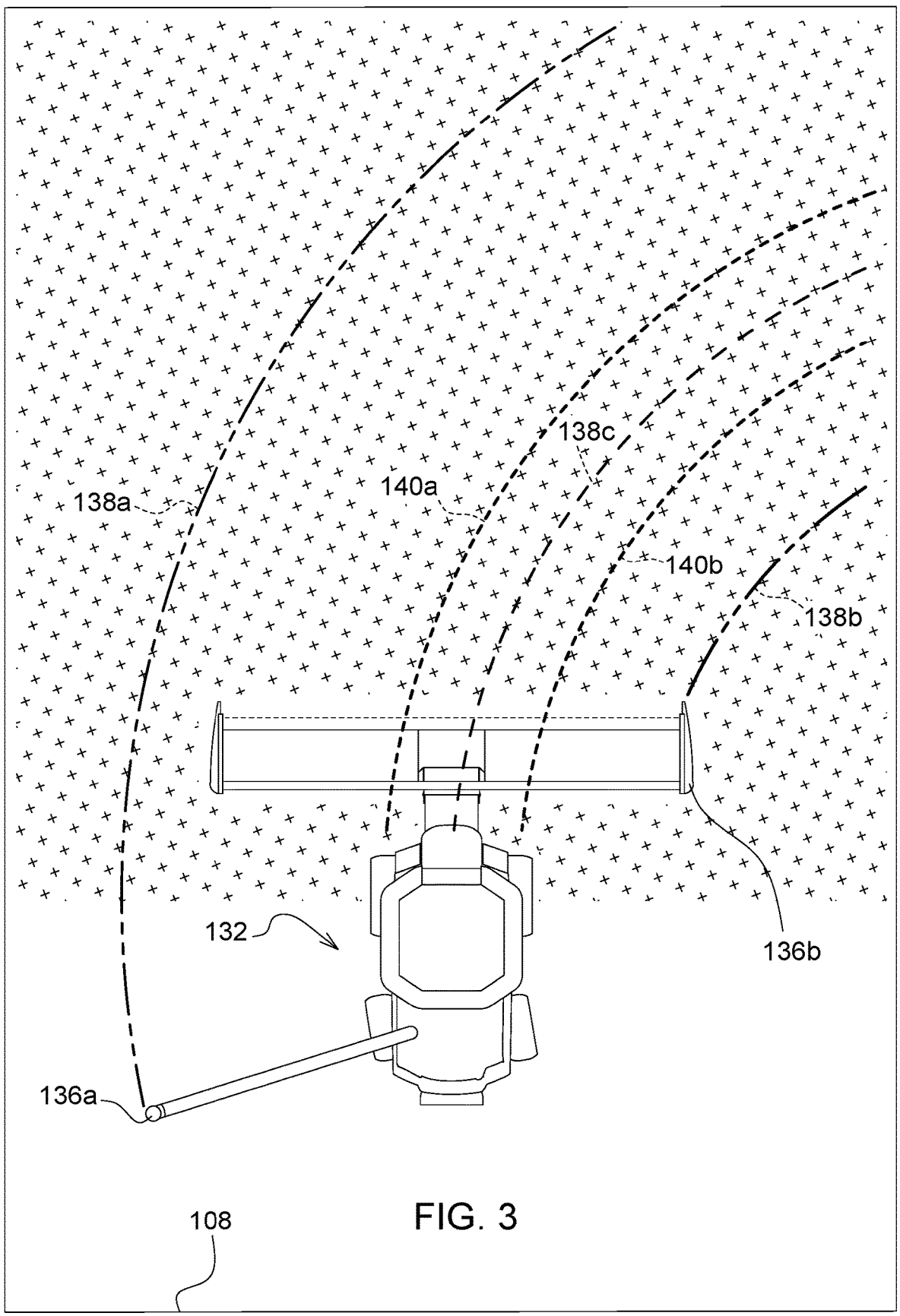
FIG. 3 is a view of the display with the bird's-eye view of the work vehicle in a second setting.

The work vehicle 100 has a movable member 120 which may rotate from a stowed position to an unloading position (compare FIG. 2 with FIG. 3). In this embodiment, the work vehicle 100 is a combine harvester and the moveable member 120 is a grain spout which is used to unload grain from a grain tank 122 included in the work vehicle 100. The moveable member 120 is a hollow cylindrical chute which is pivotally connected to the work vehicle 100 at a first end, but which is open at the second end opposite the first end so that grain may flow from the first end and out the second end. When the work vehicle 100 is not unloading grain, the moveable member 120 may be in a stowed position where the second end is located directly rearward of the first end (opposite the direction V). When the work vehicle 100 is unloading grain, for example into a grain cart being pulled alongside the work vehicle 100, the moveable member 120 may be pivoted counterclockwise so that the second end extends leftward beyond the body of the work vehicle 100 and over an opening in the grain cart. Grain (or another commodity) may then be unloaded via the moveable member 120 from the grain tank 122 into the grain cart. While the moveable member 120 is a grain spout in this embodiment, in other embodiments the moveable member may be any number of other items, for example a boom of a sprayer which may go from a stored to a spray position or a foldable implement being towed by the work vehicle 100 (e.g., a seeding, spraying, or tilling implement) or attached to the vehicle (e.g. a header) which may fold from a transport to an operation position. The other embodiments need not be in the agricultural equipment space, for example as the moveable member could also be the material dispensing boom of an asphalt repair vehicle, the crane or bucket of a service vehicle, or extendable legs of a work or recreational vehicle. These are just a few of the examples of items that could be the moveable member in other embodiments.

The posture of the moveable member 120 is sensed with a posture sensing system 124, in this embodiment an angular sensor attached to the body of the work vehicle 100 and the moveable member 120. For example, this could be a Hall-effect rotary sensor mounted on the body of the work vehicle 100 with an arm attached to the moveable member 120. The posture sensing system 124 provides a posture signal indicative of the posture of the moveable member 120 (i.e., its position, which may include orientation). The posture sensing system 124 is necessary because the moveable member has at least a portion which is outside the field of view of all the cameras 110*a-d*, and in this embodiment the entirety of the moveable member 120 is outside the field of view of the cameras 110*a-d*. Without the posture sensing system 124, no part of the moveable member 120 would be sensed or viewable. In this embodiment, the moveable member 120 has only a single degree of freedom (i.e., rotation about its pivotal attachment to the work vehicle 100), so the posture of the moveable member can be captured with just one variable, such as the angle of the moveable member 120 (e.g., 180 degrees, 255 degrees). In other embodiments, the posture sensing system 124 may sense the posture of the moveable member 120 differently, or the moveable member 188 may have additional degrees of freedom and thus additional information may need to be encoded to fully capture its posture. One alternative embodiment may be a posture sensing system that does not directly sense the posture of a moveable member, but instead estimates it using a feedforward model (e.g., starting at 180 degrees then commanding movement for five seconds results in a posture of 255 degrees). Another alternative embodiment may be a posture sensing system that requires multiple sensors, such a service vehicle with a bucket (sometimes referred to as a cherry picker) with linear displacement sensors on each linkage cylinder and an angular sensor on the linkage rotation joint, which then combines this sensor output with a kinematic model to determine the posture of the bucket and each element in its bucket linkage. Another alternative embodiment may be a posture sensing system that uses a tag on a work tool, such as an RFID or fiducial target on the bucket of an excavator, where the position of the tag (and thus, work tool) is directly sensed without sensing the linkage supporting the work tool.

The steering angle sensing system 105, display 108, cameras 110*a-d*, obstacle sensing system 114, and posture sensing system 124, are each in communication with a controller 126. As used herein, "controller" is intended to be used consistent with how the term is used by a person of skill in the art, and refers to a computing component with processing, memory, and communication capabilities which is utilized to control or communicate with one or more other components. In certain embodiments, a controller may also be referred to as a control unit, vehicle control unit (VCU), engine control unit (ECU), transmission control unit (TCU), or hydraulic, electrical or electro-hydraulic controller. In certain embodiments, a controller may be configured to receive input signals in various formats (e.g., hydraulic signals, voltage signals, current signals, CAN messages, optical signals, radio signals), and to output command signals in various formats (e.g., hydraulic signals, voltage signals, current signals, CAN messages, optical signals, radio signals). The controller 126, sometimes referred to as a vehicle control unit (VCU) in this embodiment where multiple systems of the vehicle are controlled by a central controller, receives signals from each of the steering angle sensing system 105 (steering angle signal), display 108 (operator input on a touchscreen or buttons), cameras 110*a-d* (images), obstacle sensing system 114 (obstacle signal), and posture sensing system 124 (posture signal). The controller 126 may receive these signals through a number of different communication architectures (e.g., controller area network (CAN), direct point-to-point communication) and through a number of different mediums (e.g., wired connection, wireless connection). The controller 126 also sends signals to the display 108 in order to display content for the operator. In this embodiment, the controller 126 and display 108 are each installed in the work vehicle 100, but in alternative embodiments one or both of these components may instead be located remote from the work vehicle 100, and an external communication network (e.g., cellular) may be used to keep the various components of the system in communication with each other.

The controller 126 utilizes the signals it receives in order to generate a dynamically augmented bird's-eye view 128 of the work vehicle 100, as will be described with reference to FIGS. 2-6. FIGS. 2-5 illustrate the view an operator may have of the display 108 which is displaying the dynamically augmented bird's-eye view 128 of the work vehicle 100. In alternative embodiments, this view may be displayed remotely from the work vehicle 100, such as on a phone or tablet device.

The dynamically augmented bird's-eye view 128 of the work vehicle 100 is a composite view created by the controller 126 using multiple signals. The images from the cameras 110*a-d* are joined together using methods known in the art (for example, as described in U.S. Pat. No. 7,734,417) to create a single ground surface image 130 which includes at least a portion of each of their fields of view.

The controller 126 uses the posture signal from the posture sensing system 124 to create a rendered vehicle representation 132, which provides a rendered view of the work vehicle 100 approximating what it would appear like in a bird's-eye perspective. The rendered vehicle representation 132 can be created using a simplified representation of the work vehicle 100 that is stored in memory accessible to the controller 126, for example a simplified representation of the work vehicle 100 viewed from overhead. That model may then be manipulated by adjusting the location of the moveable member 120 using the posture signal from the posture sensing system 124, so that the location of the moveable member 120 in the rendered vehicle representation 132 approximately matches its real-world counterpart.

As one example of a technique for doing so, the simplified representation of the work vehicle 100 may include everything except for the moveable member 120, and then a separate simplified representation of the moveable member may be rotated based on the posture signal (so as to be at the same angle relative to the work vehicle 100 as its real-world counterpart) then overlayed on the simplified representation of the work vehicle 100 so that the combination is a simplified representation of the work vehicle 100 including the moveable member 120 (which is the rendered vehicle representation 120). Such an example may use a posture signal of 180 degrees to render the moveable member pointing straight rearward, as in the first setting illustrated in FIG. 2, and may use a posture signal of 255 degrees to render the moveable member pointing between leftward and rearward, as in the second setting illustrated in FIG. 3. A number of different techniques to manipulate the posture of the moveable member 120 may be used in alternative embodiments.

FIGS. 2-5 depict an additional dynamic feature in the rendered vehicle representation 120, which is the steered position of the left rear tire 104*c* and the right rear tire 104*d*. In the embodiment shown, the rear tires 104*c-d* are rotated in the rendered vehicle representation 120 based on the posture signal so that their representation in the bird's-eye view matches their angle in the real world. Alternative embodiments may not include this additional dynamic feature, and may instead choose to render the wheels in a constant orientation.

The controller 126 creates a rendered path projection 134 using the steering angle signal from the steering angle sensing system 105. The rendered path projection 134 depicts the upcoming path of a few key points on the work vehicle 100. In the embodiment shown in FIGS. 2-5, these key points include the leftmost point 136a, the rightmost point 136b, the center point 136c, the left front tire 104a, and the right front tire 104b. The leftmost point 136a, representing the point of the work vehicle 100 furthest to the left of the forward direction V, is projected out to create the left outer envelope line 138a. The rightmost point 136b, representing the point of the work vehicle 100 farthest to the right relative to the forward direction V, is projected out to create the right outer envelope line 138b. The center point 136c, representing a point along the centerline of the work vehicle 100 (chosen in this case to be the front-most portion of the body of the work vehicle 100 excluding the header, but alternative embodiments may chose a center point at the front of the header, or in the fore-aft middle of the work vehicle 100), is projected out to create the center line 138c. The left front tire 104a is projected out to create the left tire line 140a. The right front tire 104b is projected out to create the right tire line 140b. In alternative embodiments, the paths of the rear tires 104c and 104d may be projected out in addition to, or instead of, the front tires 104a and 104b. In other alternative embodiments, the tire lines 140a-b may be made as thick as the tires 104a-b so as to show the area which the tire is projected to contact instead of just the centerline of the tire's path. In other alternative embodiments, tracks may be used instead of tires, and lines may be used to show the projected path of the tracks.

The projections for the outer envelope lines 138a-b, center line 138c, and tire lines 140a-b may be adjusted (curved) to reflect the projected path of the work vehicle 100 using a known relationship between the steering angle signal from the steering angle sensing system 105 and the resulting curve of these lines. The controller 126 may thus create the lines by using the steering angle signal to determine a curve shapes for each line, such as using a lookup table with the steering angle signal as an input to find output parameters for use in creating the lines. Different methods may be used to create these projections, depending on the degree of approximation desired for the particular application.

In alternative embodiments, the controller 126 may create the rendered path projection 134 without using the steering angle signal from the steering angle sensing system 105, but in such embodiments the lines of the rendered path projection 134 would be straight and would not curve based on the steering angle.

In other alternative embodiments, the controller 126 may have a vehicle guidance system integrated into it, comprising a GPS antenna connected to a GPS receiver, and a vehicle guidance control system running on the controller 126. This control system may receive a vehicle position signal from the GPS receiver and use that position signal to determine a planned path and then control the steering of the work vehicle 100 to follow that planned path, for example as described in U.S. Pat. No. 8,190,364, which is incorporated herein by reference. In such alternative embodiments, the vehicle guidance control system running on the controller 126 may provide a planned path signal to the control system creating the rendered path projection 134, allowing the controller 126 to make a more complex path projection rather than assuming the current steering angle of the work vehicle 100 will continue unchanged. If a planned path signal is provided, the controller 126 may shape the outer envelope lines 138a-b, center line 138c, and tire lines 140a-b based on the planned path signal (as one example, to copy the same curvatures as the planned path line).

As shown by comparing FIG. 2 and FIG. 3, the posture signal is used by the controller 126 to determine the leftmost point 136a. In the first setting illustrated in FIG. 1 where the moveable member 120 is in a stowed position, the leftmost point 136a is located on the left outer edge of the header of the work vehicle 100. In the second setting illustrated in FIG. 2, the moveable member 120 is in an unloading position such that the leftmost point 136a of the work vehicle 100 is now located on the moveable member 120 instead of the header. The posture signal is used to determine the leftmost point 136a, and the left outer envelope line 138a is a projected path based on the leftmost point 136a and the steering angle signal, so the posture signal is used to determine the left outer envelope line 138a in the rendered path projection 134. In this embodiment, the position of the left outer envelope line 138a is dependent on the posture signal and the shape of the left outer envelope line 138a is dependent on the steering angle signal. The difference in the rendered path projection 134 between FIG. 3 and FIG. 4 illustrates one way in which dynamically augmenting a bird's-eye view for the work vehicle 100 can result in different information being presented to the viewer which reflects a changing condition of the work vehicle 100 and its steering angle, rather than augmenting the view with a static path projection or a path projection which is dynamic only to the steering angle of the work vehicle 100 and not to the posture of the moveable member 120.

While only the leftmost point 136a is dependent on the position of the moveable member 120 in this embodiment, alternative embodiments may use the posture signal further. In alternative embodiments, the rightmost point 136b or both the outermost points of the work vehicle 100 may need to be determined using the posture signal if a portion of the moveable member 120 is capable of being the outermost point on the left or right depending on the position of the moveable member 120.

Figure 4:
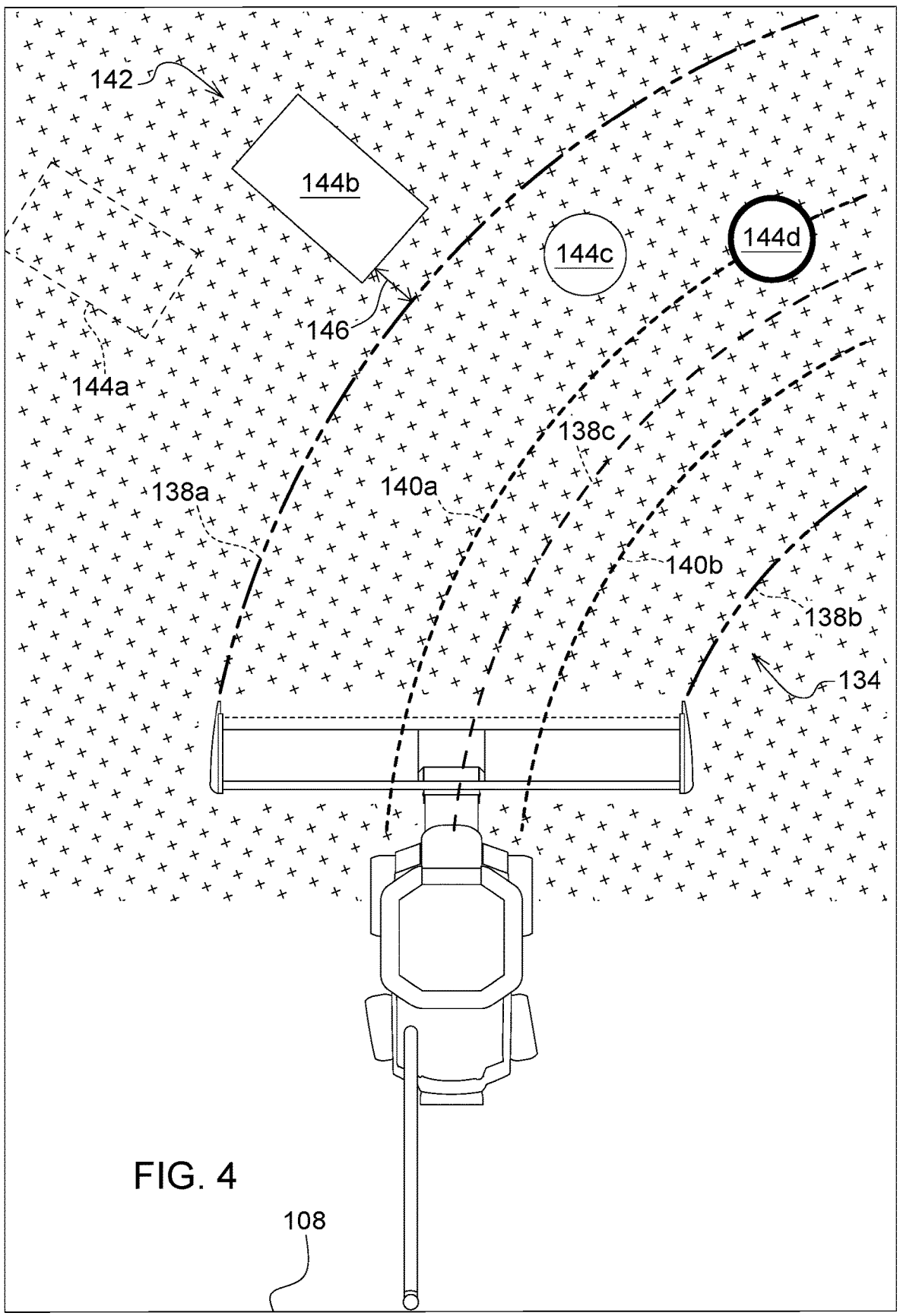
FIG. 4 is a view of the display with the bird's-eye view of the work vehicle in a third setting.
Figure 5:
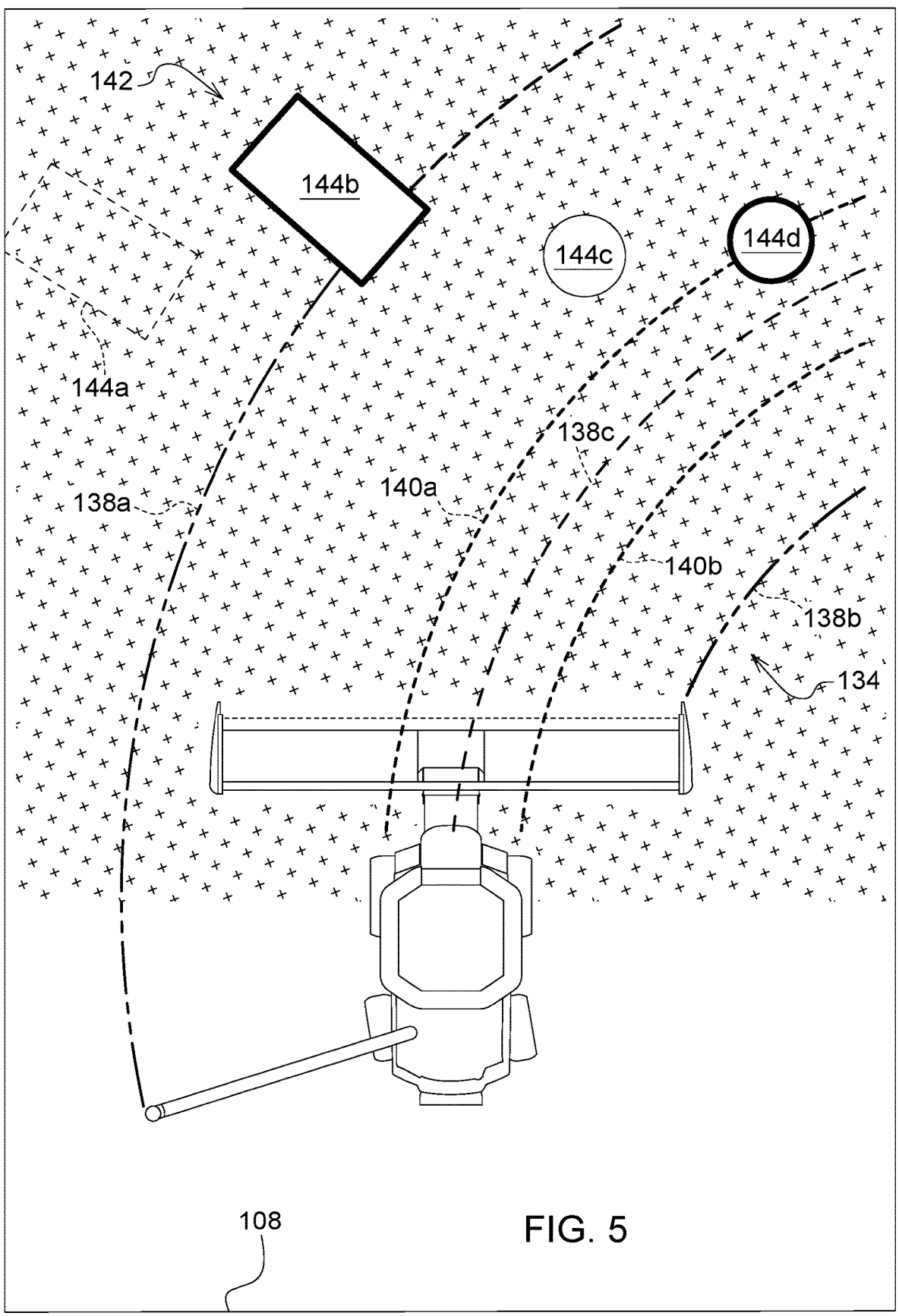
FIG. 5 is a view of the display with the bird's-eye view of the work vehicle in a fourth setting.

FIG. 4 and FIG. 5 illustrate the dynamically augmented bird's-eye view 128 in a third and fourth setting, respectively, which are similar to the first and second setting except that obstacles are now present. The third and fourth setting illustrate a rendered obstacle representation 142 which illustrates obstacles detected by the obstacle sensing system 114. The controller 126 receives the obstacle signal form the obstacle sensing system 114, and using this signal, creates the rendered obstacle representation 142 which consists of obstacles 144a-d placed according to the locations and sizes indicated by the obstacle signal. Each of the obstacles 144a-d may be depicted differently depending on its location and size.

Obstacle 144a is outside of the left outer envelope line 138a in both FIG. 4 and FIG. 5 by more than a distance threshold 146, so it is depicted with a first style of a dashed line. This first style could also include a line weighting (e.g., light), line color (e.g., green), fill color (e.g., green), or any number of other style choices intended to covey that the obstacle sensed is not projected to be in the path of the work vehicle 100. The distance threshold 146 is optional and not necessary for all embodiments, but for those embodiments utilizing such a threshold, its magnitude may vary depending by embodiment for example by varying with the accuracy of the determination of the leftmost point 136a of the work vehicle 100, the obstacle sensing system 114, the steering angle sensing system 105, and/or the rendered path projection 134.

Obstacle 144b, which at 0.5 meters tall according to the obstacle signal is above a height threshold of 0.25 meters, is outside of the left outer envelope line 138a in the third setting illustrated in FIG. 4, but within the distance threshold 146 of the left outer envelope line 138a. In FIG. 5, the moveable member 120 is in an unloading position which makes it the leftmost point 136a and which extends the left outer envelope line 138a further outward. By deploying the moveable member 120, the obstacle 144b is now between the left outer envelope line 138a and the right outer envelope line 138b (an obstacle is between these lines if any portion of it is between these lines). In FIG. 5, the obstacle 144b is depicted in a second style (solid heavy line) as it is between the outer envelope lines 138a-b, while in FIG. 4, the obstacle 144b is depicted in a third style (solid thin line) because it is not between the outer envelope lines 138a-b but is within the distance threshold 146 of one of them. The second style is different than the first style, and could also have a different line weighting (e.g., heavy), line color (e.g., red), fill color (e.g., red), or any number of other style choices intended to covey that the obstacle sensed is projected to interfere with the work vehicle 100. The third style is different than the first style and the second style, and could also have a different line weighting (e.g., medium), line color (e.g., orange), fill color (e.g., orange), or any number of other style choices intended to covey that the obstacle sensed may require increased attention, in this case because it is projected to be outside of the path of the work vehicle 100 but is close to the path. The illustration of obstacle 144b in FIG. 4 and FIG. 5 illustrates how dynamically augmenting a bird's-eye view of the work vehicle 100 to reflect the posture of the moveable member 120 and the projected path of the leftmost point 136a can result in different styles being applied to sensed obstacles in the view.

Obstacle 144c and obstacle 144d are shorter obstacles according to the obstacle signal received from the obstacle sensing system 114, falling at or below the height threshold of 0.25 meters used in this embodiment, for example 0.2 meters. The height threshold may vary in different embodiments. Obstacle 144c and obstacle 144d are both between the outer envelope lines 138a-b. However, obstacle 144c is located more than the distance threshold 146 away from the tire lines 140a-b while obstacle 144d intersects the left tire line 140a. Obstacle 144c is thus depicted using the third style, indicating that the obstacle sensed may require increased attention, in this case because it is within the path of the work vehicle 100, but is not depicted using the second style as its lower height may mean it will not interfere with the work vehicle 100, because it could perhaps pass under the work vehicle without contact. However, while obstacle 144d is the same size as obstacle 144c, it is projected to intersect the path of the left front tire 104a and thus is depicted using the second style, indicating that it is projected to interfere with the work vehicle 100.

Figure 6:
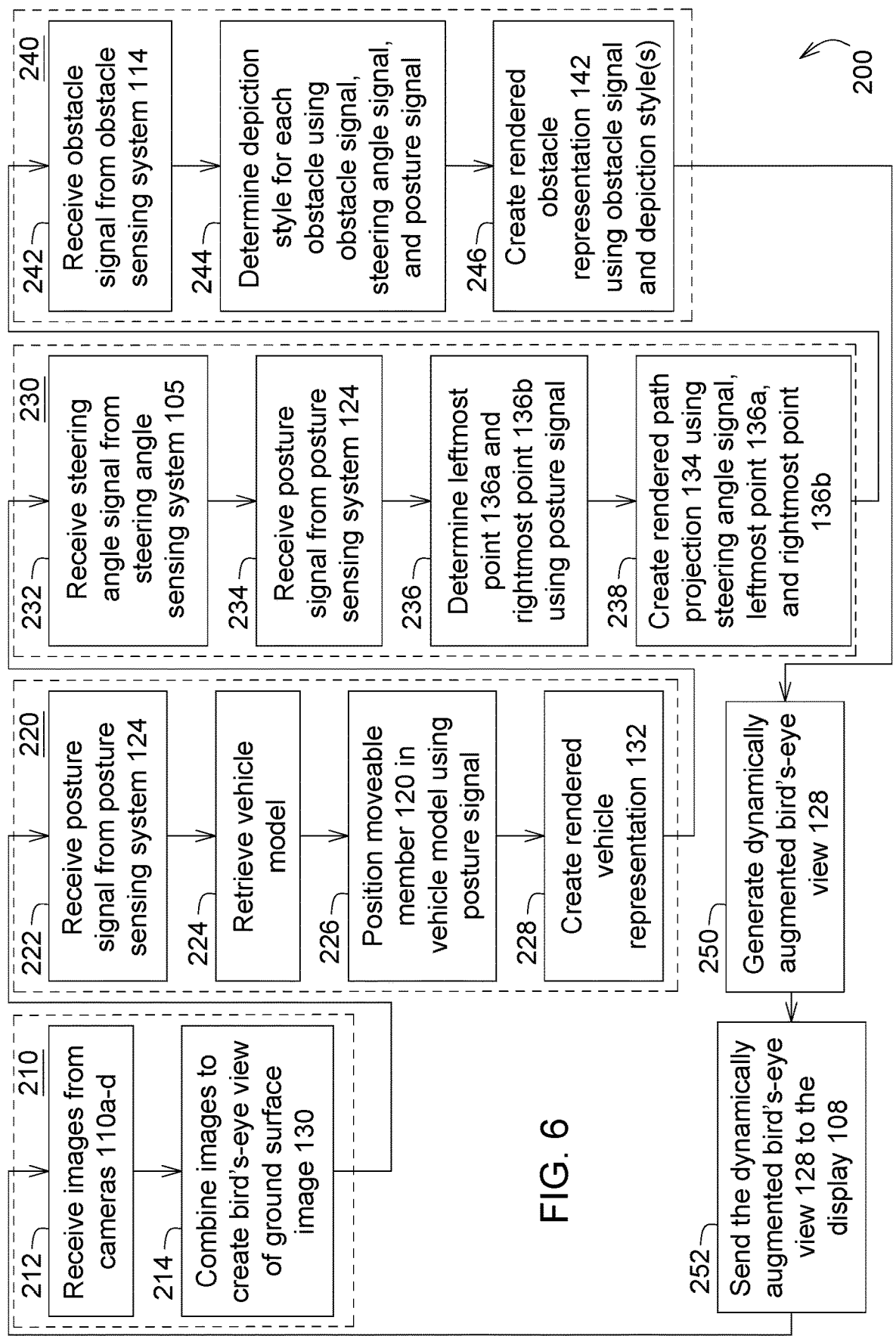
FIG. 6 is a flow diagram showing a process for creating the bird's-eye view.

FIG. 6 illustrates a control system 200, which may be executed on the controller 126 to provide the dynamically augmented bird's-eye view 128. In alternative embodiments, the control system 200 could be executed on a controller remote from the work vehicle 100, or the dynamically augmented bird's-eye view 128 may be sent to a display remote from the work vehicle 100, such as the screen of a person computer, phone, or tablet device.

The control system 200 has four modules which are performed in series in this embodiment, but may be performed in parallel in other embodiments. Module 210 is for creating the bird's-eye view, module 220 is for vehicle rendering, module 230 is for path projection, and module 240 is for obstacle rendering.

In module 210, the controller 126 receives images from cameras 110a-d in step 212. Each of cameras 110a-d sends an image of its field of view to the controller 126 at a refresh rate, such as 30 images per second, which may be referred to as 30 frames per second. In step 214, the images from each of the cameras 110a-d are combined to create one bird's-eye view according to methods known in the art. As one example, the images may be combined so that the image from each of the cameras 110a-d is positioned in the bird's-eye view in the same relative position to the other images as the relative position of the cameras 110a-d to each other on the work vehicle 100, then a seam may be formed where the images overlap such that one image is shown up to the seam and then another image is shown after the seam. This technique allows only one image to be shown in any region where the images overlap, suppressing the other image in that region to create a single view.

In module 220, the controller 126 receives the posture signal from the posture sensing system 124 in step 222. The posture signal may vary by embodiment, but in this embodiment it corresponds to a data value which is indicative of an angle of the moveable member 120 in degrees. For example, a data value of 128 may be indicative of a posture of 180 degrees, which corresponds to a stowed position with the moveable member 120 pointing straight rearward (opposite the direction V), as shown in FIG. 2 and FIG. 4. As another example, a data value of 181 may be indicative of an angle of 255 degrees, corresponding to an unloading position with the moveable member 120 pointing leftward and rearward, as shown in FIG. 3 and FIG. 5. The posture signal may vary in other embodiments, such as increasing in complexity to fully describe a more complex moveable member. As just one example, a data value of (56, 72, 12) may be indicative of the lengths of three hydraulic cylinders which, when combined with a kinematic model, may be used to describe the posture of an excavator linkage and bucket.

In step 224, the controller 126 may retrieve the vehicle model for the work vehicle 100. This model may be stored in memory accessible by the controller 126, and may be as simple as a picture file which was created to visually approximate the work vehicle 100 when viewed from overhead. Once the control system 200 has executed a loop, step 224 may be moot as the vehicle model may have already been retrieved in a prior loop and still useable without an additional retrieval operation. In step 226, the moveable member 120 may be positioned in the vehicle model using the posture signal. In this embodiment, the vehicle model retrieved in step 224 visually approximates the work vehicle 100 except for the moveable member 120, and then a visual approximation of the moveable member 120 is added to the vehicle model by step 226. In step 226, the first end of the visual approximation of the moveable member 120 is positioned at the spot where the pivot point for the moveable member 120 appears in the vehicle model. Then, the visual approximation of the moveable member 120 is pivoted around that point based on the posture indicated by the posture signal received in step 222.

In step 228, the visual approximation of the moveable member 120 is overlayed over the visual approximation of the work vehicle 100 so that the combination creates the rendered vehicle representation. In alternate embodiments, visual approximation of the moveable member 120 may be positioned and the rendered vehicle representation created using other techniques, such as animation or CAD techniques known in the art.

In module 230, the controller 126 receives the steering angle signal from the steering angle sensing system 105 in step 232. Much like the posture signal, the steering angle signal may vary by embodiment, but in this embodiment it corresponds to a data value indicative of the steering angle of the work vehicle 100 in degrees. For example, a data value of 128 may be indicative of a steering angle of 0 degrees (work vehicle straight ahead), while a data value of 96 may indicate a steering angle of −9 degrees (nine degrees leftward) and a data value of 160 may indicate a steering angle of +9 degrees (nine degrees rightward). In step 234, the controller 126 may receive the posture signal from the posture sensing system 124. Note that step 234 may be skipped if the posture of the moveable member 120 has already been determined from step 222 and the value is still available to the controller 126 in module 230.

In step 236, the controller 126 uses the posture signal to determine the leftmost point 136a and the rightmost point 136b. In this embodiment, the moveable member 120 is not capable of being pivoted to the right side of the work vehicle 100, so the rightmost point 136b may be statically assigned to the rightmost point of the header attached to the work vehicle 100, which the controller 126 may access in memory and find to be at (3, 1.5) meters, or 3 meters to the right, and 1.5 meters forward of the center point 136c chosen for the work vehicle 100. By contrast, the moveable member 120 can be pivoted to the left side of the work vehicle 100 far enough that the end of the moveable member 120 extends leftward further than the leftmost point of the header. For this embodiment, the controller 126 calculates the leftmost point on the moveable member 120 and compares it to the known leftmost point on the header, which in this embodiment is static and thus does not require further calculation. The controller 126 calculates the leftmost point of the moveable member 120 by accessing the location of the moveable member 120 pivot point (−1, −3), then accessing its length (3) meters and multiplying that by the sine and cosine of the angle of the moveable member 120 (e.g., sine of 255 degrees) and adding to the pivot point, resulting in a leftmost point 138a of approximately (−3.9, −3.3) meters. This value is then compared to the leftmost point of the header, which controller 126 accesses in memory and finds to be (−3, 1.5) meters, and the result is that the end of the moveable member 120 at (−3.9, −3.3) meters is the leftmost point 136a of the work vehicle 100.

In step 236, the controller 126 creates the rendered path projection 134 using the steering angle signal, leftmost point 136a, and the rightmost point 136b. In this embodiment, the controller 126 sets starting points for five lines. The outer envelope line starting points are set to the leftmost point 138a (−3.9, −3.3) and rightmost point 138b (3, 1.5) that were found in step 236. The center line starting point is set to the center point 136c (0,0). The tire line starting points are set to a point accessed in memory by the controller 126 associated with tire 104a and tire 104b, for example the estimated center point of the contact patch for each tire (−1.1,−0.5) (1.1,−0.5). With these starting points, five different lines may be drawn. The left outer envelope line 138a and the right outer envelope line 138b may be drawing using a first line style, such as a heavy dash-dot-dot line as shown in FIGS. 2-5. The left tire line 140a and the right tire line 140b may be drawing using a second line style, such as a medium dashed line as shown in FIGS. 2-5. The center line 138c may be drawing using a third line style, such as a light dashed style as shown in FIGS. 2-5. While these three line styles were used in this embodiment, other embodiments may used different line styles, such as by varying the line weight, line pattern, and/or line color, to name just a few ways to vary the line style.

The five lines may be drawn straight, for example if the steering angle of the work vehicle is 0 degrees, if the steering angle is unknown, or if for embodiments utilizing a simplified projection. If the steering angle is known, the five lines may instead be adjusted or curved using the steering angle to more accurately project their paths. The steering angle may be used to adjust these curvatures using a number of different techniques, but in this embodiment the steering angle is used to calculate a turning circle center, which in turn is used to calculate the radius of each line. The steering angle is an input in a lookup table (which may be generated through calculations using the vehicle's geometry or instead empirical data) which then provides the position of the center of the turning circle for the work vehicle 100. For example, using a steering angle of +10 degrees as the input to the lookup table may generate an output of (21.5,−4.5) as the position of the center of the turning circle for the work vehicle. The radius of each line may then be set to the distance between the center of the turning circle and the starting point of that line, e.g., the square root of the sum of the squares of the x and y distances between the two points. In this example, that results in radii for the left outer envelope line 138a, the right outer envelope line 138b, the center line 138c, the left tire line 140a, and the right tire line 140b of 25.4, 19.4, 22, 23, and 21 meters, respectively. With the starting point for each line and the radius of each line determined, the controller 126 may then create all five lines in order to create the rendered path projection 134 in step 238.

In module 240, the controller 126 receives the obstacle signal from the obstacle sensing system 114 in step 242. In this embodiment, the obstacle signal is a position, a width, and a height of the obstacle, e.g., (−4.2, 10.5, 0.8, 0.5) for the obstacle 144a, (−2.5, 12, 0.8, 0.5) for the obstacle 144b, (0.5, 12, 0.4, 0.2) for the obstacle 144c, and (3.3, 12.5, 0.4, 0.2) for the obstacle 144d. The obstacle width and height may be estimated using methods known in the art for the type of sensing being done (stereo vision, radar, lidar). In alternate embodiments, the obstacle signal may be formed differently.

In step 244, the controller 126 determines the depiction style for each obstacle communicated in the obstacle signal, using the steering angle signal and posture signal (which are used to generate the five projected paths making up the rendered path projection 134). If the entirety of the obstacle is positioned outside the outer envelope lines 138a-b, which can be determined by comparing the obstacle signal for that obstacle with the outer envelope lines 138a-b generated in step 238, then the obstacle is represented with the first style. If the obstacle is outside the outer envelope lines 138a-b, but within the distance threshold 146 of the outer envelope lines 138a-b, then the obstacle can be represented by either the first style (if a distance threshold is not used), the second style (if anything within the distance threshold is desired to be marked as interfering), or the third style (if things within the distance threshold, but not intersecting the path, are desired to be marked as possibly requiring increased attention). In this embodiment, obstacles within the distance threshold 146 but not intersecting the path of the work vehicle 100 are marked in the third style, which can be seen for obstacle 144b in FIG. 4, versus obstacle 144b in FIG. 5 where it is marked in the second style because it intersects the left outer envelope line 138a after the moveable member 120 is moved to an unloading position.

Obstacles below the height threshold, such as obstacles 144*c-d*, may be marked in the third style as they may require increased attention because it is uncertain whether the work vehicle 100 can pass over them without issue. However, if such an obstacle intersects a tire line for the work vehicle, which occurs with obstacle 144*d*, then the obstacle may be marked with the second style as it is sensed to interfere with the work vehicle 100 as the tire 104*a* is projected to intersect it.

After each obstacle in the obstacle signal has a depiction style in step 244, the controller 126 proceeds to step 246 where it creates the rendered obstacle representation 142. The controller 126 creates a representation for each obstacle, in this embodiment a bounding rectangle or circle sized using the width portion of the obstacle signal, using the depiction style for that obstacle, and positioning it using the position portion of the obstacle signal.

The controller 126 proceeds to step 250, where it generates the dynamically augmented bird's-eye view 128 using a composite of the ground surface image 130, rendered vehicle representation 132, rendered path projection 134, and rendered obstacle representation 142. This step may be performed in a number of different ways, but in this embodiment, each of the four items is created using the same coordinate system such that they can be layered at this time. First, the rendered path projection 134 is overlayed on the ground surface image 130 such that the rendered path projection 134 is shown in any area where both the ground surface image 130 and the rendered path projection 134 has content. Second, the rendered obstacle representation 142 is overlayed on the rendered path projection 134 and the ground surface image 130. Last, the rendered vehicle representation 132 is overlayed on the obstacle representation 142, rendered path projection 134, and the ground surface image 130. This results in a priority order where, if more than one image or render appears in an area of the dynamically augmented bird's-eye view 128, only the highest priority image or render is shown, and the order goes from highest to lowest with the rendered vehicle representation 132, the rendered obstacle representation 142, the rendered path projection 134, and the ground surface image 130.

In other embodiments, the priority of the overlays for the different images and renders may vary. Further, the method of overlay may vary as well, from the simple priority order in this embodiment in which only one image or view is shown in any areas where more than one is present, to hybrid approaches that may blend the different images and renders in the areas in which more than one is present. Blending the different images and renders may be desirable in certain applications, for example it may be desirable to allow the ground surface image 130 to appear in some capacity in areas where it overlaps with the rendered vehicle representation 132 in order to give an operator or remote manager the opportunity to see what is passing underneath the work vehicle 100.

Finally, in step 252, the controller 126 sends the dynamically augmented bird's-eye view 128 to the display 108 where it can be viewed by the operator of the work vehicle 100. Although the dynamically augmented bird's-eye view 128 is both generated and displayed on the work vehicle 100 in this embodiment, in alternative embodiments it could be generated off-board, viewed off-board, or both. As one example alternative embodiment, the images from cameras 110*a-d*, posture signal, steering angle signal, and obstacle signal could be transmitted off-board to a remote server where they are processed to create the images and renders used to create the dynamically augmented bird's-eye view 128, which is then transmitted to a tablet being used by a farm or site manager to visualize the environment and status of the work vehicle 100. After step 252, the controller 126 proceeds back to the first step 212 to repeat the process.

Although control system 200 is illustrated as a flowchart in FIG. 6, the disclosure is not limited to such steps and the order of steps of presented, and it would be well within the skill of one of ordinary skill in the art to reorder, combine, or split many of the steps and achieve the same result.

As used herein, "using" or "based on" means "using at least in part" or "based at least in part on" and does not mean "solely using" or "based solely on," such that it neither excludes nor requires additional factors. Determining an output "using" or "based on" an input does not mean the input is the only factor being used to determine the output, nor does it mean that the output is driven by the input in every situation. For example, the leftmost point 136*a* is determined using the posture signal in the embodiment illustrated and described in FIGS. 2-6, even in a situation where the leftmost point 136*a* does not change while the posture signal indicates the moveable member 120 moved from 180 degrees to 220 degrees. In that situation, the posture signal was still used to determine that the leftmost point 136*a* was not going to be on the moveable member 120.

Without in any way limiting the scope, interpretation, or application of the claims appearing below, a technical effect of one or more of the example embodiments disclosed herein is the creation of a bird's-eye view of a work vehicle which is dynamically augmented with a vehicle representation, path projection, and obstacle representation each of which varies based on signals from sensing systems on the work vehicle. This includes dynamic interaction between the representations, such as when a changing vehicle representation (deployment of a moveable member) causes a change in the path projection (a larger outer envelope size) which in turn necessitates that the obstacle representation change (obstacles that were outside the vehicle's path are now intersecting the new, wider, vehicle path). Another technical effect of one or more of the example embodiments disclosed herein is that by changing the vehicle representation dynamically to reflect the positions of moveable parts, a viewer can ascertain both the status of the vehicle and its environment in a single view.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A vehicle with a dynamically augmented bird's-eye view, comprising:
   a moveable member attached to the vehicle;
   a posture sensing system configured to provide a posture signal indicative of a posture of the moveable member;
   a bird's-eye camera system having a field of view including ground surface adjacent to the vehicle, the bird's-eye camera system configured to provide images of its field of view;
   a display; and
   a controller in communication with the posture sensing system, the bird's-eye camera system, and the display, the controller configured to:
      receive the posture signal from the posture sensing system;
      receive the images from the bird's-eye camera system;
      create a rendered vehicle representation, the rendered vehicle representation including the moveable member, the moveable member positioned in the rendered vehicle representation using the posture signal;
      create a rendered path projection, the rendered path projection including an outer envelope line representing the projected path of an outermost point of the vehicle, the outermost point of the vehicle determined using the posture signal;
      generate the dynamically augmented bird's-eye view using the images, the rendered vehicle representation, and the rendered path projection; and
      display the dynamically augmented bird's-eye view on the display.

2. The vehicle of claim 1, further comprising:
   a steering angle sensing system configured to provide a steering angle signal indicative of a steering angle of the vehicle;
   wherein the controller is in communication with the steering angle sensing system and the controller is further configured to:
      receive the steering angle signal from the steering angle sensing system; and
      adjust the outer envelope line using the steering angle signal.

3. The vehicle of claim 1, further comprising:
   a vehicle guidance system configured to automatically control the steering of the vehicle and to provide a planned path signal;
   wherein the controller is in communication with the vehicle guidance system and the controller is further configured to:
      receive the planned path signal from the vehicle guidance system; and
      adjust the outer envelope line using the planned path signal.

4. The vehicle of claim 1, further comprising:
   an obstacle sensing system, the obstacle sensing system configured to provide an obstacle signal indicative of at least a position of an obstacle in the area surrounding the vehicle;
   wherein the controller is in communication with the obstacle sensing system and the controller is further configured to:
      receive the obstacle signal;
      create a rendered obstacle representation, the obstacle positioned in the rendered obstacle representation using the obstacle signal; and
      generate the dynamically augmented bird's-eye view using the images, the rendered vehicle representation, the rendered path projection, and the rendered obstacle representation.

5. The vehicle of claim 4, wherein the bird's-eye camera system comprises a plurality of cameras and the obstacle sensing system identifies obstacles using stereo vision processing on images from at least two of the plurality of cameras.

6. The vehicle of claim 4, wherein the obstacle sensing system comprises at least one radar unit and identifies obstacles using a signal from the at least one radar unit.

7. The vehicle of claim 4, wherein the obstacle sensing system comprises at least one lidar unit and identifies obstacles using a signal from the at least one lidar unit.

8. The vehicle of claim 4, wherein:
   the outer envelope line is a left outer envelope line;
   the rendered path projection includes the left outer envelope line representing the projected path of the leftmost point of the vehicle and a right outer envelope line representing the projected path of the rightmost point of the vehicle, and at least one of the left outer envelope line and the right outer envelope line is determined using the posture signal;
   the rendered obstacle representation depicts the obstacle with a first style if the obstacle is positioned outside of the left and right outer envelope lines; and
   the rendered obstacle representation depicts the obstacle with a second style different from the first style if it is positioned between the left and right outer envelope lines.

9. The vehicle of claim 4, wherein:
   the outer envelope line is a left outer envelope line;
   the rendered path projection includes the left outer envelope line representing the projected path of the leftmost point of the vehicle and a right outer envelope line representing the projected path of the rightmost point of the vehicle, and at least one of the left outer envelope line and the right outer envelope line is determined using the posture signal;
   the obstacle signal is further indicative of a height of the obstacle;
   the rendered obstacle representation depicts the obstacle with a first style if the obstacle is positioned outside of the left and right outer envelope lines;
   the rendered obstacle representation depicts the obstacle with a second style different from the first style if it is positioned between the left and right outer envelope lines and the height of the obstacle is above a height threshold; and
   the rendered obstacle representation depicts the obstacle with a third style different from the first style and the second style if it is positioned between the left and right outer envelope lines and the height of the obstacle is at or below the height threshold.

10. The vehicle of claim 2, further comprising:
an obstacle sensing system, the obstacle sensing system configured to provide an obstacle signal indicative of at least a position of an obstacle in the area surrounding the vehicle;
wherein the controller is in communication with the obstacle sensing system and the controller is further configured to:
receive the obstacle signal;
create a rendered obstacle representation, the obstacle positioned in the rendered obstacle representation using the obstacle signal; and
generate the dynamically augmented bird's-eye view using the images, the rendered vehicle representation, the rendered path projection, and the rendered obstacle representation.

11. The vehicle of claim 10, wherein:
the outer envelope line is a left outer envelope line;
the rendered path projection includes the left outer envelope line representing the projected path of the leftmost point of the vehicle and a right outer envelope line representing the projected path of the rightmost point of the vehicle, at least one of the left outer envelope line and the right outer envelope line is determined using the posture signal, and the controller is further configured to adjust the right outer envelope line using the steering angle signal;
the rendered obstacle representation depicts the obstacle with a first style if the obstacle is positioned outside of the left and right outer envelope lines; and
the rendered obstacle representation depicts the obstacle with a second style different from the first style if it is positioned between the left and right outer envelope lines.

12. A vehicle with a dynamically augmented bird's-eye view, comprising:
a moveable member attached to the vehicle;
a posture sensing system configured to provide a posture signal indicative of a posture of the moveable member;
a steering angle sensing system configured to provide a steering angle signal indicative of a steering angle of the vehicle;
a plurality of cameras, each of the plurality of cameras having a field of view including a ground surface in an area surrounding the vehicle, each of the plurality of cameras configured to provide an image of its field of view;
a display; and
a controller in communication with the posture sensing system, the steering angle sensing system, the plurality of cameras, and the display, the controller configured to:
receive the posture signal from the posture sensing system;
receive the steering angle signal from the steering angle sensing system;
receive the images from the plurality of cameras;
create a rendered vehicle representation, the rendered vehicle representation including the moveable member, the moveable member positioned in the rendered vehicle representation using the posture signal;
create a rendered path projection including a left outer envelope line and a right outer envelope line, the left outer envelope line representing the projected path of a leftmost point of the vehicle using the steering angle signal, the right outer envelope line representing the projected path of a rightmost point of the vehicle using the steering angle sensor, at least one of the leftmost and rightmost points determined using the posture signal;
generate the dynamically augmented bird's-eye view using a composite of the images, the rendered vehicle representation, and the rendered path projection; and
display the dynamically augmented bird's-eye view on the display.

13. The vehicle of claim 12, further comprising:
an obstacle sensing system, the obstacle sensing system configured to provide an obstacle signal indicative of a position and height of an obstacle in the area surrounding the vehicle;
wherein the controller is in communication with the obstacle sensing system and the controller is further configured to:
receive the obstacle signal;
create a rendered obstacle representation, the obstacle positioned in the rendered obstacle representation using the obstacle signal, the obstacle depicted with a first style if the obstacle is positioned outside the left and right outer envelope lines, the obstacle depicted with a second style different than the first style if the obstacle is positioned between the left and right outer envelope lines and the height of the obstacle is above a height threshold, the obstacle depicted with a third style different than the first style and second style if the obstacle is positioned between the left and right outer envelope lines and the height of the obstacle is at or below the height threshold; and
generate the dynamically augmented bird's-eye view using a composite of the images, the rendered vehicle representation, the rendered path projection, and the rendered obstacle representation.

14. The vehicle of claim 12, further comprising:
an obstacle sensing system, the obstacle sensing system configured to provide an obstacle signal indicative of a position and height of an obstacle in the area surrounding the vehicle;
wherein the controller is in communication with the obstacle sensing system and the controller is further configured to:
receive the obstacle signal;
create a rendered obstacle representation, the obstacle positioned in the rendered obstacle representation using the obstacle signal, the obstacle depicted with a first style if the obstacle is positioned outside the left and right outer envelope lines and beyond a distance threshold of either the left or right outer envelope lines, the obstacle depicted with a second style different than the first style if the height of the obstacle is above a height threshold and (i) the obstacle is positioned between the left and right outer envelope lines or (ii) the obstacle is within the distance threshold of either the left or right outer envelope line, the obstacle depicted with a third style different than the first style and the second style if the height of the obstacle is at or below the height threshold and (i) the obstacle is positioned between the left and right outer envelope lines or (ii) the obstacle is within the distance threshold of either the left or right outer envelope line; and
generate the dynamically augmented bird's-eye view using a composite of the images, the rendered vehicle representation, the rendered path projection, and the rendered obstacle representation.

15. The vehicle of claim 12, further comprising:
an obstacle sensing system, the obstacle sensing system configured to provide an obstacle signal indicative of a position and height of an obstacle in the area surrounding the vehicle;
wherein the controller is in communication with the obstacle sensing system and the controller is further configured to:
receive the obstacle signal;
create the path projection to further include at least two tire lines each of which represents the projected path of a tire of the vehicle, using the steering angle signal;
create a rendered obstacle representation, the obstacle positioned in the rendered obstacle representation using the obstacle signal, the obstacle depicted with a first style if the obstacle is positioned outside the left and right outer envelope lines, the obstacle depicted with a second style different than the first style if (i) the height of the obstacle is above a height threshold and the obstacle is positioned between the left and right outer envelope lines or (ii) the obstacle intersects either tire line, the obstacle depicted with a third style different than the first style and the second style if the height of the obstacle is at or below the height threshold and the obstacle is positioned between the left and right outer envelope lines without intersecting either tire line; and
generate the dynamically augmented bird's-eye view using a composite of the images, the rendered vehicle representation, the rendered path projection, and the rendered obstacle representation.

16. The vehicle of claim 12, further comprising
an obstacle sensing system, the obstacle sensing system configured to provide an obstacle signal indicative of a position and height of an obstacle in the area surrounding the vehicle;
wherein the controller is in communication with the obstacle sensing system and the controller is further configured to:
receive the obstacle signal;
create the path projection to further include at least two tire lines each of which represents the projected path of a tire of the vehicle using the steering angle signal;
create a rendered obstacle representation, the obstacle positioned in the rendered obstacle representation using the obstacle signal, the obstacle depicted with a first style if the obstacle is positioned outside the left and right outer envelope lines and beyond a distance threshold of either the left or right outer envelope lines, the obstacle depicted with a second style different than the first style if (i) the height of the obstacle is above a height threshold and the obstacle is positioned between or within the distance threshold of the left and right outer envelope lines or (ii) the obstacle intersects either tire line, the obstacle depicted with a third style different than the first style and the second style if the height of the obstacle is at or below the height threshold and the obstacle is positioned between or within the distance threshold of the left and right outer envelope lines without intersecting either tire line; and
generate the dynamically augmented bird's-eye view using a composite of the images, the rendered vehicle representation, the rendered path projection, and the rendered obstacle representation.

17. A method for visualizing a vehicle, comprising:
receiving a posture of a moveable member attached to the vehicle;
receiving images from a plurality of cameras each having a field of view including a ground surface in an area surrounding the vehicle;
creating a rendered vehicle representation using the received posture to position the moveable member in the rendered vehicle representation;
creating a rendered path projection including a left outer envelope line and a right outer envelope line, the left outer envelope line representing the projected path of a leftmost point of the vehicle, the right outer envelope line representing the projected path of a rightmost point of the vehicle, at least one of the leftmost point and the rightmost point determined using the posture;
generating a dynamically augmented bird's-eye view using a composite of the images, rendered vehicle representation, and rendered path projection; and
sending the dynamically augmented bird's-eye view to a display.

18. The method of claim 17, further comprising:
receiving a steering angle of the vehicle; and
using the received steering angle to create the left outer envelope line and the right outer envelope line.

19. The method of claim 18, further comprising:
receiving a position of an obstacle in the area surrounding the vehicle;
creating a rendered obstacle representation, the obstacle positioned in the rendered obstacle representation using the received position of the obstacle; and
generating the dynamically augmented bird's-eye view using a composite of the images, rendered vehicle representation, rendered path projection, and rendered obstacle representation.

20. The method of claim 19, further comprising:
depicting the obstacle in a first style if the obstacle is positioned outside the left and right outer envelope lines and beyond a distance threshold of either the left or right outer envelope lines; and
depicting the obstacle in a second style different than the first style if the obstacle is positioned between the left and right outer envelope lines or the obstacle is within the distance threshold of either the left or right outer envelope line.

* * * * *